United States Patent
Hudson et al.

(10) Patent No.: US 11,702,136 B2
(45) Date of Patent: Jul. 18, 2023

(54) REVERSE STEERING MODES FOR AGRICULTURAL VEHICLES

(71) Applicant: Deere & Company, Moline, IL (US)

(72) Inventors: Scott A. Hudson, Cedar Falls, IA (US);
Jeffrey L. Lubben, Waterloo, IA (US);
Jeffrey M. Tott, Cedar Falls, IA (US)

(73) Assignee: DEERE & COMPANY, Moline, IL (US)

(*) Notice: Subject to any disclaimer, the term of this patent is extended or adjusted under 35 U.S.C. 154(b) by 218 days.

(21) Appl. No.: 16/574,869

(22) Filed: Sep. 18, 2019

(65) Prior Publication Data
US 2021/0078633 A1    Mar. 18, 2021

(51) Int. Cl.
*B62D 15/02* (2006.01)
*B62D 12/00* (2006.01)
*B62D 49/06* (2006.01)

(52) U.S. Cl.
CPC .......... *B62D 15/025* (2013.01); *B62D 12/00* (2013.01); *B62D 49/06* (2013.01)

(58) Field of Classification Search
CPC ...... B62D 15/025; B62D 12/00; B62D 49/06; B62D 55/0655; B62D 6/007; B62D 15/00
See application file for complete search history.

(56) References Cited

U.S. PATENT DOCUMENTS 3,596,730 A * 8/1971 Cecce ................... B62D 7/1536
180/236
3,771,241 A * 11/1973 Lindell .................. B62D 12/00
180/419
4,043,422 A * 8/1977 Barrett ..................... E01C 19/26
180/418
4,398,616 A    8/1983 Braden et al.
4,399,884 A * 8/1983 Vandehey .............. B62D 15/00
180/23

(Continued)

FOREIGN PATENT DOCUMENTS

CN    106891993 A  *  6/2017
CN    105102305 B  * 10/2017   .......... B62D 7/1509

(Continued)

OTHER PUBLICATIONS

German Search Report issued in application No. DE102020210251.1, dated Jun. 1, 2021, 12 pages.

*Primary Examiner* — Sze-Hon Kong
(74) *Attorney, Agent, or Firm* — Taft Stettinius & Hollister LLP; Stephen F. Rost

(57) ABSTRACT

Vehicles, control systems for vehicles, and methods of operating vehicles are disclosed herein. A vehicle includes a frame structure, a front section, a rear articulation section, and a control system. The front section is coupled to the frame structure and to a front plurality of wheels supported for movement on a front axle. The rear articulation section is coupled to the frame structure and to a rear plurality of wheels supported for movement on a rear axle. The rear articulation section is pivotally coupled to the front section via an articulation joint and arranged opposite the front section along a vehicle axis. The control system is coupled to the frame structure and includes a mode selector configured to provide input indicative of a mode selected by an operator in use of the vehicle and a controller communicatively coupled to the mode selector.

19 Claims, 10 Drawing Sheets

(56) References Cited

U.S. PATENT DOCUMENTS

| | | | |
|---|---|---|---|
| 4,565,257 A | | 1/1986 | Hanson |
| 4,638,883 A | * | 1/1987 | Moriizumi ............. B62D 7/142 180/321 |
| 4,771,851 A | * | 9/1988 | Nystuen ................. B62D 12/00 180/419 |
| 4,802,545 A | * | 2/1989 | Nystuen ................. B62D 12/00 180/419 |
| 4,982,799 A | * | 1/1991 | Fujimoto ............. B62D 7/1509 172/2 |
| 5,079,706 A | * | 1/1992 | Yamaguchi ........... G05D 1/0033 180/168 |
| 5,427,195 A | * | 6/1995 | Paul ....................... B60K 17/30 180/242 |
| 5,784,967 A | * | 7/1998 | Lohr ....................... B62D 7/144 105/3 |
| 5,802,489 A | | 9/1998 | Orbach et al. |
| 5,996,722 A | * | 12/1999 | Price ..................... B62D 7/1509 180/234 |
| 6,206,118 B1 | | 3/2001 | Menze et al. |
| 6,213,490 B1 | * | 4/2001 | Lykken ................. B62D 53/02 280/492 |
| 6,374,940 B1 | * | 4/2002 | Pickert ..................... B62D 5/30 180/405 |
| 6,640,915 B2 | * | 11/2003 | Haringer ............... A01B 51/026 180/6.24 |
| 7,219,913 B2 | * | 5/2007 | Atley ................... B62D 13/025 280/426 |
| 7,383,114 B1 | | 6/2008 | Lange et al. |
| RE42,036 E | * | 1/2011 | Dillon .................. B62D 13/005 280/419 |
| 7,942,604 B2 | | 5/2011 | Willis et al. |
| 9,376,141 B1 | * | 6/2016 | Shi ......................... B60T 1/005 |
| 2002/0027025 A1 | * | 3/2002 | Kobayashi ............. B62D 12/00 180/6.2 |
| 2007/0240928 A1 | * | 10/2007 | Coltson ................... E02F 3/283 180/411 |
| 2008/0017436 A1 | * | 1/2008 | Dower ................. B62D 7/1509 180/402 |
| 2008/0135322 A1 | * | 6/2008 | Smith ..................... B60K 23/04 180/338 |
| 2012/0043159 A1 | * | 2/2012 | Clark ....................... B66F 9/065 182/69.6 |
| 2012/0150390 A1 | * | 6/2012 | Ruhter .................. E02F 3/7645 701/42 |
| 2014/0145415 A1 | * | 5/2014 | Filla ....................... B62D 12/00 280/446.1 |
| 2015/0223386 A1 | * | 8/2015 | Nafziger ............... A01D 43/105 180/6.24 |
| 2016/0002885 A1 | * | 1/2016 | Sharma ................. B62D 12/00 701/41 |
| 2016/0297474 A1 | * | 10/2016 | Shi ......................... B60T 13/741 |
| 2018/0050724 A1 | | 2/2018 | Morselli et al. |
| 2018/0354337 A1 | * | 12/2018 | McAdam ................. E02F 9/02 |
| 2020/0359548 A1 | * | 11/2020 | Benevelli ................. B62D 9/00 |

FOREIGN PATENT DOCUMENTS

| | | |
|---|---|---|
| DE | 102010033401 A1 | 2/2011 |
| DE | 102016011186 A1 | 3/2018 |

* cited by examiner

REVERSE STEERING MODES FOR AGRICULTURAL VEHICLES

FIELD OF THE DISCLOSURE

The present disclosure relates, generally, to control systems for vehicles such as agricultural vehicles, and, more specifically, to control systems for agricultural vehicles adapted for use with one or more work implements.

BACKGROUND

Agricultural vehicles (e.g., tractors) may be adapted to tow and/or drive movement of one or more work implements in use thereof. Such vehicles may each include an attachment interface by which a work implement is connected to the agricultural vehicle. Connection of a work implement to an agricultural vehicle, particularly in certain operational modes of the vehicle, may demand precise movement and/or positioning of the vehicle relative to the work implement. Devices, systems, and/or methods for controlling movement and/or positioning of an agricultural vehicle relative to a work implement to facilitate connection of the work implement to the agricultural vehicle remain areas of interest.

SUMMARY

The present disclosure may comprise one or more of the following features and combinations thereof.

According to one aspect of the present disclosure, a vehicle may include a frame structure, a front section, a rear articulation section, and a control system. The front section may be coupled to the frame structure and to a front plurality of wheels supported for movement on a front axle. The rear articulation section may be coupled to the frame structure and to a rear plurality of wheels supported for movement on a rear axle. The rear articulation section may be pivotally coupled to the front section via an articulation joint and arranged opposite the front section along a vehicle axis. The control system may be coupled to the frame structure and include a mode selector configured to provide input indicative of a mode selected by an operator in use of the vehicle and a controller communicatively coupled to the mode selector. The controller may include memory having instructions stored therein that are executable by a processor to cause the processor to receive the input provided by the mode selector and to selectively enable an operator to steer the front plurality of wheels and the rear plurality of wheels independently of one another based on the input to facilitate positioning of an implement attachment interface of the vehicle relative to a work implement in use of the vehicle.

In some embodiments, the mode selector may be configured to provide input indicative of a reverse mode selected by an operator in use of the vehicle, and the instructions stored in the memory may be executable by the processor to cause the processor to receive the input provided by the mode selector and to selectively enable an operator to steer the front plurality of wheels and the rear plurality of wheels independently of one another based on the input in the reverse mode. Additionally, in some embodiments, the mode selector may be configured to provide input indicative of one of a plurality of reverse modes selected by an operator in use of the vehicle, and the instructions stored in the memory may be executable by the processor to cause the processor to receive the input provided by the mode selector and to selectively enable an operator to steer the front plurality of wheels and the rear plurality of wheels independently of another based on the input in a default reverse mode of the plurality of reverse modes. Further, in some embodiments yet still, the mode selector may be configured to provide input indicative of one of a plurality of reverse modes selected by an operator in use of the vehicle, and the plurality of reverse modes may include a default reverse mode in which steering of the front plurality of wheels and the rear plurality of wheels may be performed independently of another, a front section steering reverse mode in which only steering of the front plurality of wheels may be performed, and a rear articulation section steering reverse mode in which only steering of the rear plurality of wheels may be performed.

In some embodiments, the instructions stored in the memory may be executable by the processor to cause the processor to determine, based on the input, whether operation of the vehicle in a default reverse mode is desired and to selectively enable a front section steering system associated with the front plurality of wheels and a rear articulation section steering system associated with the rear plurality of wheels in response to that determination to permit steering of the front plurality of wheels and the rear plurality of wheels independently of one another. The instructions stored in the memory may be executable by the processor to cause the processor to determine, based on the input, whether operation of the vehicle in a front section steering reverse mode is desired and to selectively enable the front section steering system and disable the rear articulation section steering system in response to that determination to permit steering of the front plurality of wheels only. The instructions stored in the memory may be executable by the processor to cause the processor to determine, based on the input, whether operation of the vehicle in a rear articulation section steering reverse mode is desired and to selectively disable the front section steering system and enable the rear articulation section steering system in response to that determination to permit steering of the rear plurality of wheels only.

In some embodiments, the instructions stored in the memory may be executable by the processor to cause the processor to determine, based on the input, whether operation of the vehicle in a forward mode is desired and to synchronize operation of a front section steering system associated with the front plurality of wheels and a rear articulation section steering system associated with the rear plurality of wheels in response to a determination that operation of the vehicle in a forward mode is desired. The instructions stored in the memory may be executable by the processor to cause the processor to determine whether operation of the vehicle in a default reverse mode is desired in response to a determination that operation of the vehicle in a forward mode is not desired and to enable unsynchronized operation of the front section steering system and the rear articulation section steering system in response to a determination that operation of the vehicle in the default reverse mode is desired. Additionally, in some embodiments, the instructions stored in the memory may be executable by the processor to cause the processor to determine whether operation of the vehicle in a default reverse mode is desired in response to a determination that operation of the vehicle in a forward mode is not desired and to enable operation of the vehicle in either a front section steering reverse mode in which only steering of the front plurality of wheels may be performed or a rear articulation section steering reverse mode in which only steering of the rear plurality of wheels may be performed in response to a determination that operation of the vehicle in the default reverse mode is not desired.

According to another aspect of the present disclosure, a control system may be mounted on a vehicle that includes a frame structure, a front section coupled to the frame structure and to a plurality of front wheels supported for movement on a front axle, and a rear articulation section coupled to the frame structure and to a rear plurality of wheels supported for movement on a rear axle and pivotally coupled to the front section via an articulation joint. The control system may include a mode selector and a controller. The mode selector may be configured to provide input indicative of a mode selected by an operator in use of the vehicle. The controller may be communicatively coupled to the mode selector, and the controller may include memory having instructions stored therein that are executable by a processor to cause the processor to receive the input provided by the mode selector and to selectively enable an operator to steer the front plurality of wheels and the rear plurality of wheels independently of one another based on the input.

In some embodiments, the instructions stored in the memory may be executable by the processor to cause the processor to determine, based on the input, whether operation of the vehicle in a default reverse mode is desired and to selectively enable a front section steering system associated with the front section and a rear articulation section steering system associated with the rear articulation section in response to that determination to permit steering of the front plurality of wheels and the rear plurality of wheels independently of one another. The instructions stored in the memory may be executable by the processor to cause the processor to determine, based on the input, whether operation of the vehicle in a front section steering reverse mode is desired and to selectively enable the front section steering system and disable the rear articulation section steering system in response to that determination to permit steering of the front plurality of wheels only. The instructions stored in the memory may be executable by the processor to cause the processor to determine, based on the input, whether operation of the vehicle in a rear articulation section steering reverse mode is desired and to selectively disable the front section steering system and enable the rear articulation section steering system in response to that determination to permit steering of the rear plurality of wheels only.

In some embodiments, the instructions stored in the memory may be executable by the processor to cause the processor to determine, based on the input, whether operation of the vehicle in a forward mode is desired and to synchronize operation of a front section steering system associated with the front section and a rear articulation section steering system associated with the rear articulation section in response to a determination that operation of the vehicle in a forward mode is desired. The instructions stored in the memory may be executable by the processor to cause the processor to determine whether operation of the vehicle in a default reverse mode is desired in response to a determination that operation of the vehicle in a forward mode is not desired and to enable unsynchronized operation of the front section steering system and the rear articulation section steering system in response to a determination that operation of the vehicle in the default reverse mode is desired.

According to yet another aspect of the present disclosure, a method of operating a vehicle including a frame structure, a front section coupled to the frame structure and to a plurality of front wheels supported for movement on a front axle, and a rear articulation section coupled to the frame structure and to a rear plurality of wheels supported for movement on a rear axle and pivotally coupled to the front section via an articulation joint may include receiving, by a controller of the vehicle, input indicative of a mode selected by an operator in use of the vehicle, and selectively enabling, by the controller, an operator to steer the front plurality of wheels and the rear plurality of wheels independently of one another based on the input.

In some embodiments, the method may include determining, by the controller and based on the input, whether operation of the vehicle in a default reverse mode is desired, and enabling, by the controller, a front section steering system associated with the front section and a rear articulation section steering system associated with the rear articulation section to permit steering of the front plurality of wheels and the rear plurality of wheels independently of one another in response to determining that operation of the vehicle in the default reverse mode is desired. Additionally, in some embodiments, the method may include determining, by the controller and based on the input, whether operation of the vehicle in a front section steering reverse mode is desired, and enabling, by the controller, the front section steering system and disabling, by the controller, the rear articulation section steering system to permit steering of the front plurality of wheels only in response to determining that operation of the vehicle in the front section steering reverse mode is desired. Further, in some embodiments yet still, the method may include determining, by the controller and based on the input, whether operation of the vehicle in a rear articulation section steering reverse mode is desired, and enabling, by the controller, the rear articulation section steering system and disabling, by the controller, the front section steering system to permit steering of the rear plurality of wheels only in response to determining that operation of the vehicle in the rear articulation section steering reverse mode is desired.

These and other features of the present disclosure will become more apparent from the following description of the illustrative embodiments.

BRIEF DESCRIPTION OF THE DRAWINGS

The invention described herein is illustrated by way of example and not by way of limitation in the accompanying figures. For simplicity and clarity of illustration, elements illustrated in the figures are not necessarily drawn to scale. For example, the dimensions of some elements may be exaggerated relative to other elements for clarity. Further, where considered appropriate, reference labels have been repeated among the figures to indicate corresponding or analogous elements.

DETAILED DESCRIPTION

Figure 1:
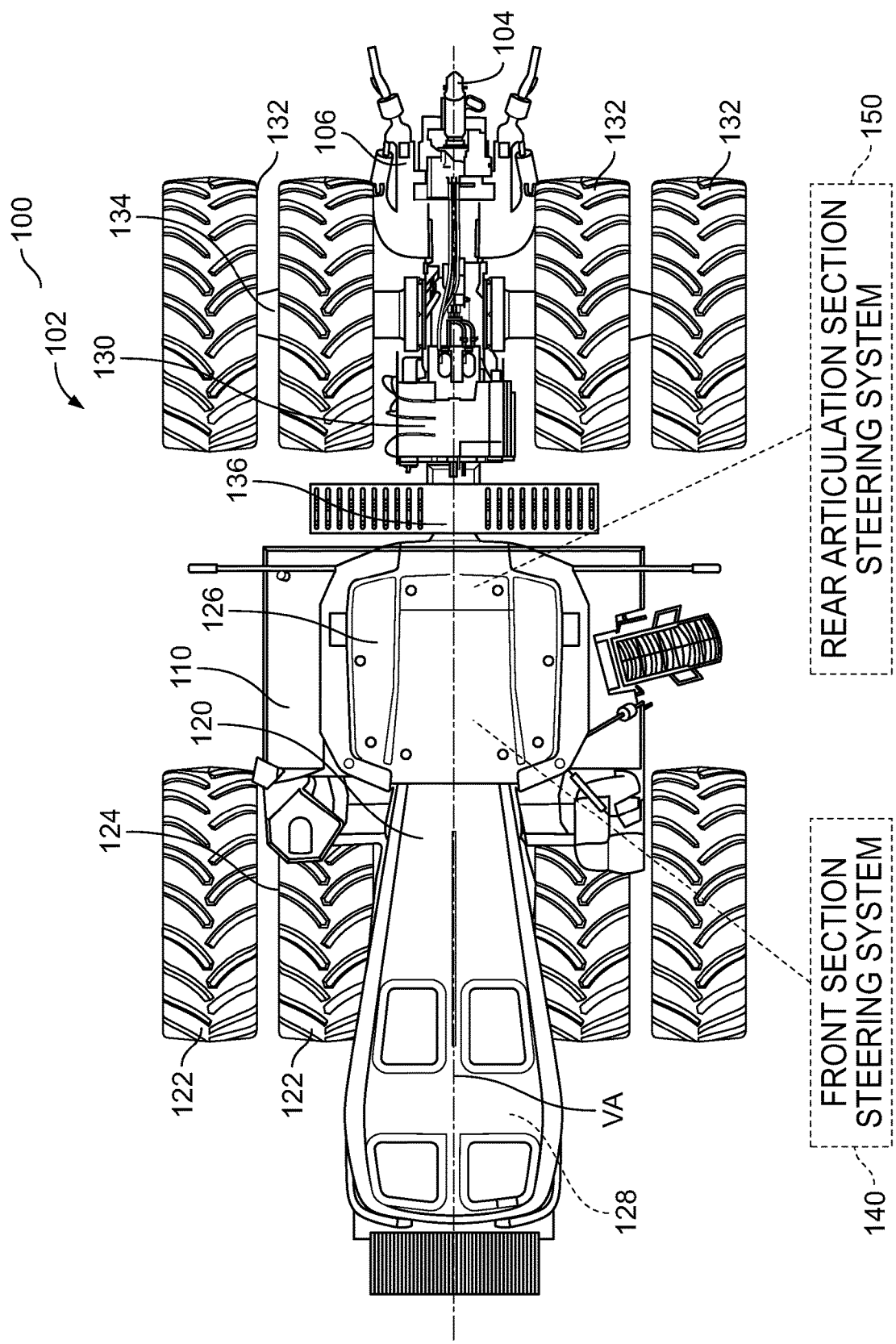
FIG. 1 is a top view of an agricultural vehicle that includes a front section coupled to front wheels and a rear articulation section coupled to rear wheels and pivotally coupled to the front section.

While the concepts of the present disclosure are susceptible to various modifications and alternative forms, specific embodiments thereof have been shown by way of example in the drawings and will be described herein in detail. It should be understood, however, that there is no intent to limit the concepts of the present disclosure to the particular forms disclosed, but on the contrary, the intention is to cover all modifications, equivalents, and alternatives consistent with the present disclosure and the appended claims.

References in the specification to "one embodiment," "an embodiment," "an illustrative embodiment," etc., indicate that the embodiment described may include a particular feature, structure, or characteristic, but every embodiment may or may not necessarily include that particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to effect such feature, structure, or characteristic in connection with other embodiments whether or not explicitly described. Additionally, it should be appreciated that items included in a list in the form of "at least one A, B, and C" can mean (A); (B); (C); (A and B); (A and C); (B and C); or (A, B, and C). Similarly, items listed in the form of "at least one of A, B, or C" can mean (A); (B); (C); (A and B); (A and C); (B and C); or (A, B, and C).

In the drawings, some structural or method features may be shown in specific arrangements and/or orderings. However, it should be appreciated that such specific arrangements and/or orderings may not be required. Rather, in some embodiments, such features may be arranged in a different manner and/or order than shown in the illustrative figures. Additionally, the inclusion of a structural or method feature in a particular figure is not meant to imply that such feature is required in all embodiments and, in some embodiments, may not be included or may be combined with other features.

A number of features described below may be illustrated in the drawings in phantom. Depiction of certain features in phantom is intended to convey that those features may be hidden or present in one or more embodiments, while not necessarily present in other embodiments. Additionally, in the one or more embodiments in which those features may be present, illustration of the features in phantom is intended to convey that the features may have location(s) and/or position(s) different from the locations(s) and/or position(s) shown.

Referring now to FIG. 1, an agricultural vehicle 100 is embodied as, or otherwise includes, a tractor 102 that is configured to tow, pull, or otherwise drive movement of, one or more work implements (not shown) which may be attached thereto. The tractor 102 includes an implement attachment interface 104 to attach the one or more work implements at a rear end 106 of the tractor 102. It should be appreciated that in some embodiments, the implement attachment interface 104 may be embodied as, or otherwise include, a hitch, a drawbar, or the like.

In some embodiments, the illustrative tractor 102 may be embodied as, or otherwise include, any one of a number of tractors manufactured by John Deere. For example, the tractor 102 may be embodied as, or otherwise include, any one of the following: a series 9570R Tractor, a series 9620R Tractor, a series 9470RT Tractor, a series 9520RT Tractor, a series 9570RT Tractor, a series 9420RX Tractor, a series 9470RX Tractor, a series 9520RX Tractor, a series 9570RX Tractor, or a series 9620RX Tractor. Of course, in other embodiments, it should be appreciated that the tractor 102 may be embodied as, or otherwise include, any other suitable tractor or agricultural vehicle.

It should be appreciated that the tractor 102 may be embodied as, or otherwise include, equipment used in one or more of a variety of applications. In the illustrative embodiment, the tractor 102 is adapted for use in one or more agricultural applications as indicated above. In other embodiments, however, the tractor 102 may be embodied as, included in, or otherwise adapted for use with, equipment used in lawn and garden, construction, landscaping and ground care, golf and sports turf, forestry, engine and drivetrain, or government and military applications, for example. In such embodiments, the vehicle 100 of the present disclosure may be included in, or otherwise adapted for use with, tractors, front end loaders, scraper systems, cutters and shredders, hay and forage equipment, planting equipment, seeding equipment, sprayers and applicators, tillage equipment, utility vehicles, mowers, dump trucks, backhoes, track loaders, crawler loaders, dozers, excavators, motor graders, skid steers, tractor loaders, wheel loaders, rakes, aerators, skidders, bunchers, forwarders, harvesters, swing machines, knuckleboom loaders, diesel engines, axles, planetary gear drives, pump drives, transmissions, generators, or marine engines, among other suitable equipment.

The illustrative tractor 102 includes a frame structure 110, a front section 120, and a rear articulation section 130. The frame structure 110 may include, or otherwise be embodied as, a main frame or main chassis of the tractor 102. The front section 120 is coupled to the frame structure 110 and includes front wheels 122 that are supported for movement on a front axle 124. The front section 120 includes an operator cab 126 in which various operational controls for the tractor 102 are provided, as described in greater detail below. The rear articulation section 130 is coupled to the frame structure 110 and to rear wheels 132 that are supported for movement on a rear axle 134. The rear articulation section 130 is pivotally coupled to the front section 120 via an articulation joint 136 and arranged opposite the front section 120 along a vehicle axis VA. Because the rear articulation section 130 is configured for pivotal movement relative to the front section 120 as will be apparent from the discussion that follows, the vehicle 100 may be referred to as an articulated vehicle 100.

In the illustrative embodiment, the front section 120 includes a drive unit or engine 128 that is configured to supply driving power to one or more driven components of the tractor 102. The drive unit 128 is embodied as, or otherwise includes, any device capable of supplying rotational power to driven components of the tractor 102 to drive those components. In some embodiments, rotational power supplied by the drive unit 128 may be provided to the driven components of the tractor 102 by one or more transmission(s). In one example, the drive unit 128 may be configured to supply power to one or more transmission(s) that is/are coupled to the front wheels 122 and/or the rear wheels 132 and operable to provide various predetermined speed ratios selectable by an operator in reverse and forward operating modes. Additionally, in some embodiments, the drive unit 128 may be coupled to a pump or generator to provide hydraulic, pneumatic, or electrical power to one or more components of the tractor 102, as the case may be.

The illustrative tractor 102 includes a front section steering system 140 associated with the front section 120 and a rear articulation section steering system 150 associated with the rear articulation section 130. The front section steering system 140 is embodied as, or otherwise includes, a collection of devices that are cooperatively configured to adjust the position and/or angular orientation of the front wheels 122 and the front axle 124 and thereby steer those components during operation of the tractor 102 in response to steering input provided by an operator, which may be provided via a front section steering wheel (not shown) located in the operator cab 126, for example. Similarly, the rear articulation section steering system 150 is embodied as, or otherwise includes, a collection of devices that are cooperatively configured to adjust the position and/or angular orientation of the rear wheels 132 and the rear axle 134 and thereby steer those components during operation of the tractor 102 in response to steering input provided by an operator, which may be provided via a rear articulation section steering wheel (not shown) located in the operator cab 126. It should be appreciated that each of the steering systems 140, 150 may include, or otherwise be embodied as, one or more linkages, racks, pinions, bars, brackets, rods, gears, pulleys, sprockets, wheels, bearings, shafts, chains, belts, axles, actuators, valves, tracks, differentials, or the like which are cooperatively configured to steer the wheels 122, 132 and the corresponding axles 124, 134 based on the steering input provided by the operator.

Figure 5:
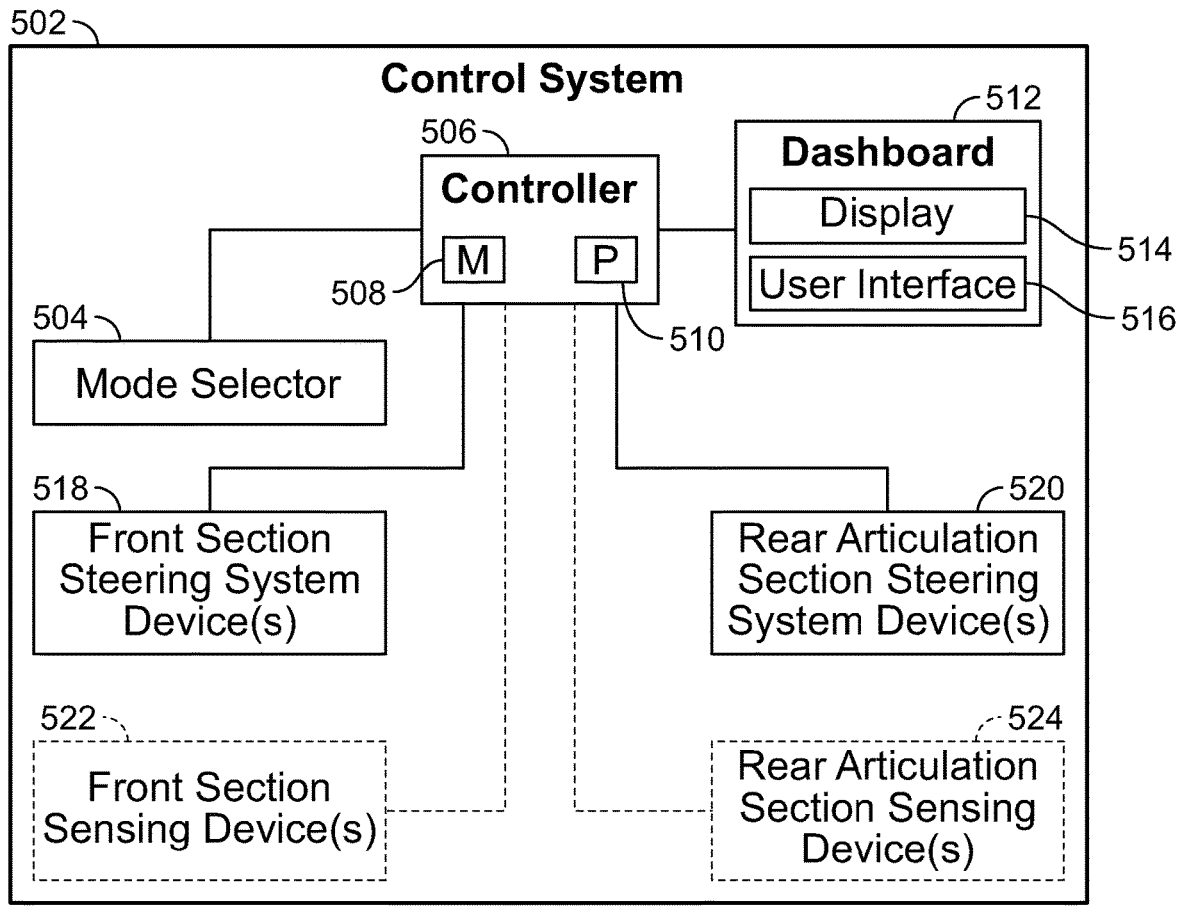
FIG. 5 is a diagrammatic view of a control system for the vehicle shown in FIG. 1.

To control operation of the front section steering system 140 and the rear articulation section steering system 150, and particularly to control operation of the steering systems 140, 150 to facilitate predetermined orientational adjustments of the front wheels 122 and the front axle 124 and/or the rear wheels 132 and the rear axle 134 based on operator input, the tractor 102 illustratively includes a control system 502 (see FIG. 5). The control system 502 is coupled to and mounted on the frame structure 110. As described in greater detail below, the control system 502 includes a mode selector 504 configured to provide input indicative of a mode selected by an operator in use of the vehicle 100 and a controller 506 communicatively coupled to the mode selector 504. The controller 506 includes memory 508 having instructions stored therein that are executable by a processor 510 to cause the processor 510 to receive the input provided by the mode selector 504 and to selectively enable, based on the input, an operator to steer the front plurality of wheels 122 and the rear plurality of wheels independently 132 of one another.

Such control by the controller 506 facilitates positioning of the implement attachment interface 104 relative to a work implement to be attached thereto in use of the vehicle 100. In at least one operating mode (e.g., a default reverse mode 410 as further discussed below), the control system 502 enables the angular orientation of each of the wheels 122, 132 to be adjusted and/or set independently via the corresponding front section and rear articulation section steering systems 140, 150 to any value within a predetermined range of angular orientations. As a result, the angular orientations attained by the wheels 122, 132 in that operating mode have a high degree of variability, which may equip the vehicle 100 for use with a number of work implement platforms in a number of applications.

Figure 2:
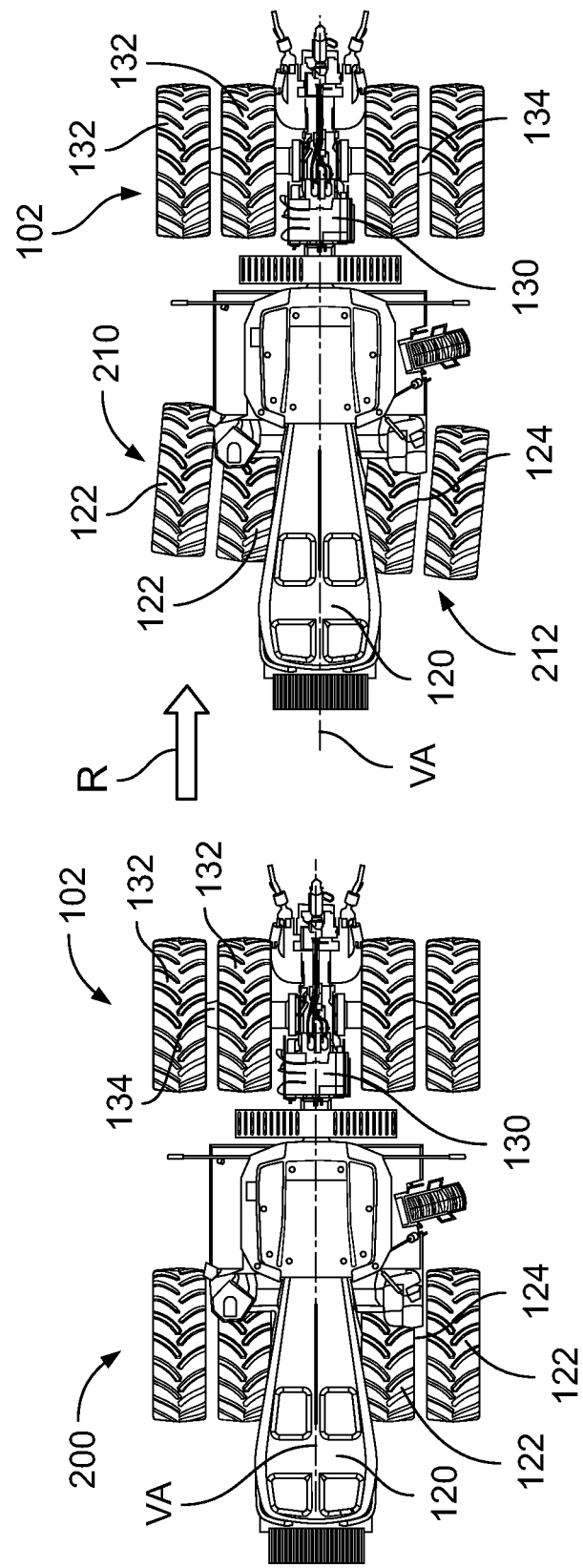
FIG. 2 is a top view of the agricultural vehicle of FIG. 1 depicted in a reverse operating mode in which only steering of the front wheels may be performed.
Figure 3:
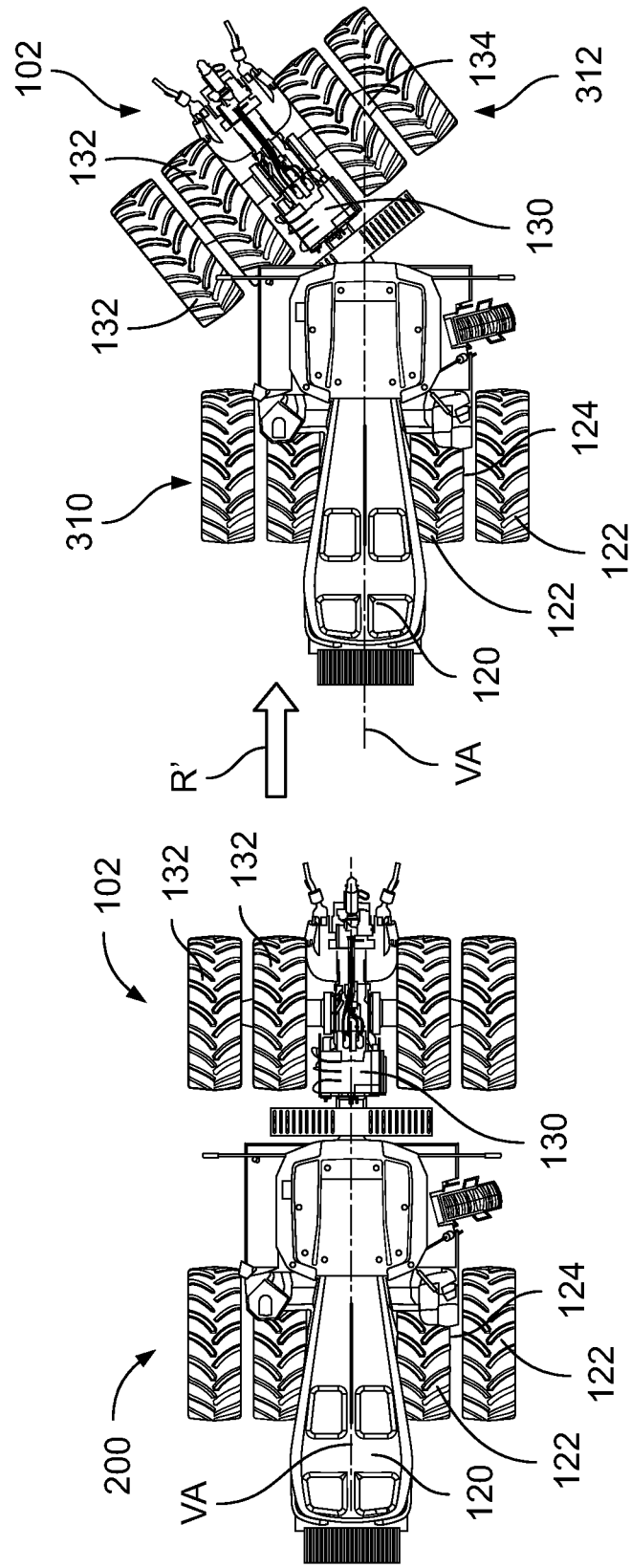
FIG. 3 is a top view of the agricultural vehicle of FIG. 1 depicted in another reverse operating mode in which only steering of the rear wheels may be performed.
Figure 4:
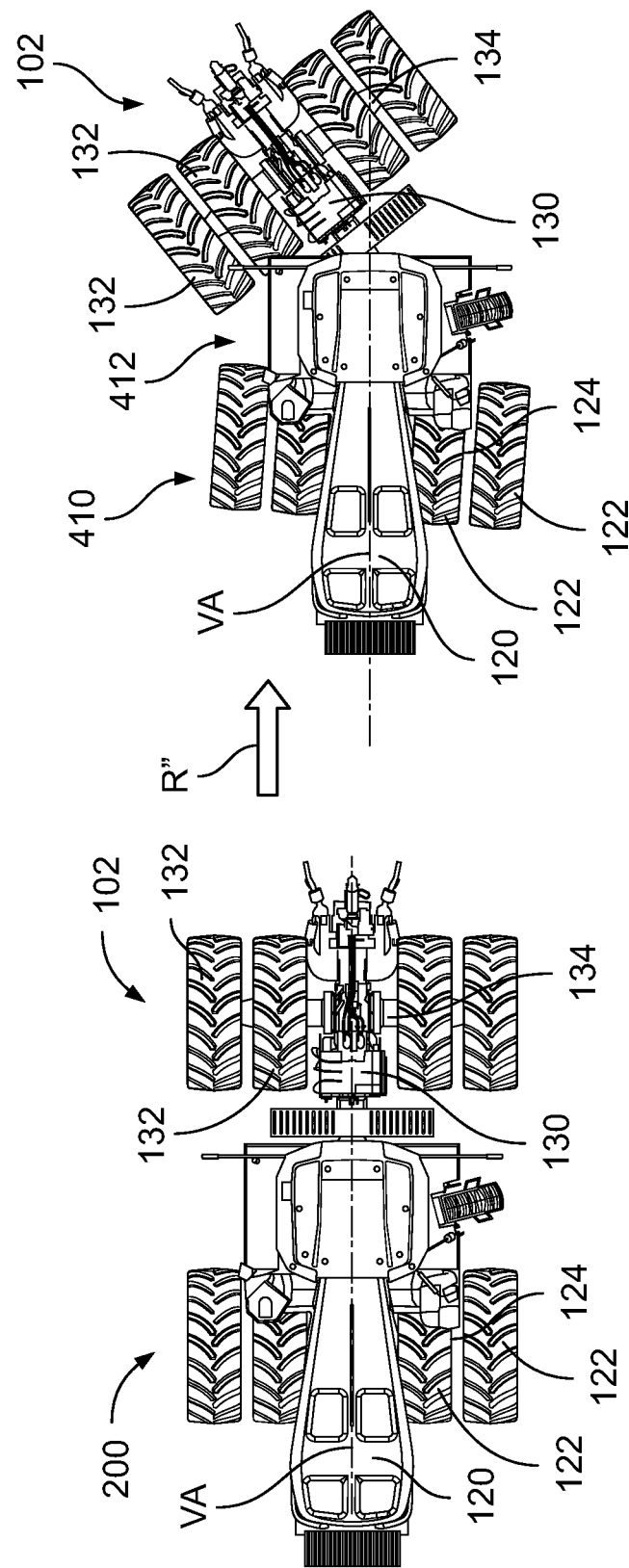
FIG. 4 is a top view of the agricultural vehicle of FIG. 1 depicted in yet another reverse operating mode in which steering of the front wheels and the rear wheels may be performed independently of one another.

Referring now to FIGS. 2-4, operation of the illustrative tractor 102 is depicted in several reverse operating modes. More specifically, operation of the tractor 102 in a front section steering reverse mode 210 is shown in FIG. 2, operation of the tractor 102 in a rear articulation section steering reverse mode 310 is shown in FIG. 3, and operation of the tractor 102 in a default reverse mode 410 is shown in FIG. 4. In each of FIGS. 2-4, the tractor 102 is depicted on the left in a baseline orientation 200 in which the wheels 122, 132 extend along, and are oriented substantially parallel to, the vehicle axis VA. For the purposes of the present disclosure, in the baseline orientation 200 of the tractor 102, each of the wheels 122, 132 is oriented at an angle of zero degrees, or an angle substantially close to zero degrees, relative to the vehicle axis VA. It should be appreciated that other orientations of the wheels 122, 132 are described below with reference to the vehicle axis VA.

Referring now to FIG. 2, in comparison to the angular orientation of the wheels 122 in the baseline orientation 200 of the tractor 102 shown on the left, the wheels 122 are oriented at an angle of approximately 5 degrees relative to the vehicle axis VA in an exemplary front section steering orientation 212 of the tractor 102 shown on the right. The wheels 132 are oriented at an angle of substantially zero degrees relative to the vehicle axis VA in the exemplary orientation 212. The arrow R indicates that the tractor 102 moves from left to right (i.e., in a reverse direction) in the front section steering reverse mode 210. It should be appreciated, of course, that adjustment of the angular orientation of the wheels 122 in the mode 210 may occur in either a first direction (e.g., a clockwise direction) or a second direction opposite the first direction (e.g., a counterclockwise direction).

During operation, as described in greater detail below, in response to input provided by the mode selector 504 indicative of the selection of the front section steering reverse mode 210, the instructions stored in the memory 508 of the controller 506 are executable by the processor 510 to cause the processor 510 to enable the front section steering system 140 and disable the rear articulation section steering system 150. As a result, steering of only the wheels 122 is permitted in the mode 210. For the purposes of the present disclosure, adjustment of the angular orientation of the wheels 122 in the mode 210 is permitted to a more limited extent than adjustment of the angular orientation of the wheels 132 in the rear articulation section steering reverse mode 310. Therefore, the mode 210 may be said to provide, or otherwise be associated, fine steering adjustments in use of the tractor 102, whereas the mode 310 may be said to provide, or otherwise be associated with, coarse steering adjustments in use of the tractor 102.

Referring now to FIG. 3, in comparison to the angular orientation of the wheels 132 in the baseline orientation 200 of the tractor 102 shown on the left, the wheels 132 are oriented at an angle of approximately 38 degrees relative to the vehicle axis VA in an exemplary rear articulation section steering orientation 312 of the tractor 102 shown on the right. The wheels 122 are oriented at an angle of substantially zero degrees relative to the vehicle axis VA in the exemplary orientation 312. The arrow R' indicates that the tractor 102 moves from left to right (i.e., in a reverse direction) in the rear articulation section steering reverse mode 310. It should be appreciated, of course, that adjustment of the angular orientation of the wheels 132 in the mode 310 may occur in either a first direction (e.g., a clockwise direction) or a second direction opposite the first direction (e.g., a counterclockwise direction).

During operation, as described in greater detail below, in response to input provided by the mode selector 504 indicative of the selection of the rear articulation section steering reverse mode 310, the instructions stored in the memory 508 of the controller 506 are executable by the processor 510 to cause the processor 510 to enable the rear articulation section steering system 150 and disable the front section steering system 140. As a result, steering of only the wheels 132 is permitted in the mode 310.

Referring now to FIG. 4, in comparison to the angular orientation of the wheels 132 in the baseline orientation 200 of the tractor 102 shown on the left, the wheels 132 are oriented at an angle of approximately 38 degrees relative to the vehicle axis VA in an exemplary default steering orientation 412 of the tractor 102 shown on the right. The wheels 122 are oriented at an angle of approximately 5 degrees relative to the vehicle axis VA in the exemplary orientation 412. The arrow R" indicates that the tractor 102 moves from left to right (i.e., in a reverse direction) in the default reverse mode 410. It should be appreciated, of course, that adjustment of the angular orientation of the wheels 122, 132 in the mode 410 may occur in either a first direction (e.g., a clockwise direction) or a second direction opposite the first direction (e.g., a counterclockwise direction).

During operation, as described in greater detail below, in response to input provided by the mode selector 504 indicative of the selection of the default reverse mode 410, the instructions stored in the memory 508 of the controller 506 are executable by the processor 510 to cause the processor 510 to enable the front section and rear articulation section steering systems 140, 150. As a result, the wheels 122, 132 may be steered independently of one another in the mode 410.

Referring now to FIG. 5, the illustrative control system 502 is configured to control operation of the tractor 102 in the reverse modes mentioned above (i.e., the modes 210, 310, 410) and other non-reverse modes (e.g., one or more neutral and/or forward modes). In the illustrative embodiment, the control system 502 includes the mode selector 504 communicatively coupled to the controller 506, the controller 506, a dashboard 512 communicatively coupled to the controller 506, one or more front section steering system device(s) 518 communicatively coupled to the controller 506, and one or more rear articulation section steering system device(s) 520 communicatively coupled to the controller 506. In some embodiments, the control system 502 may include one or more front section sensing device(s) 522 communicatively coupled to the controller 506 and one or more rear articulation section sensing device(s) 524 communicatively coupled to the controller 506.

The mode selector 504 of the illustrative control system 502 is embodied as, or otherwise includes, any device or collection of devices capable of providing input to the controller 506 that is indicative of a mode selected by an operator in use of the vehicle 100. In some embodiments, the mode selector 504 may be embodied as, or otherwise include, a dial, a knob, a lever, or the like. In any case, in the illustrative embodiment, the mode selector 504 is configured to enable an operator to select any one of the reverse modes 210, 310, 410 described above, a neutral mode, or a forward mode in use of the vehicle 100.

The processor 510 of the illustrative controller 506 may be embodied as, or otherwise include, any type of processor, controller, or other compute circuit capable of performing various tasks such as compute functions and/or controlling the functions of the tractor 102. For example, the processor 510 may be embodied as a single or multi-core processor(s), a microcontroller, or other processor or processing/controlling circuit. In some embodiments, the processor 510 may be embodied as, include, or otherwise be coupled to an FPGA, an application specific integrated circuit (ASIC), reconfigurable hardware or hardware circuitry, or other specialized hardware to facilitate performance of the functions described herein. Additionally, in some embodiments, the processor 510 may be embodied as, or otherwise include, a high-power processor, an accelerator co-processor, or a storage controller. In some embodiments still, the processor 510 may include more than one processor, controller, or compute circuit.

The memory device 508 of the illustrative controller 506 may be embodied as any type of volatile (e.g., dynamic random access memory (DRAM), etc.) or non-volatile memory capable of storing data therein. Volatile memory may be embodied as a storage medium that requires power to maintain the state of data stored by the medium. Non-limiting examples of volatile memory may include various types of random access memory (RAM), such as dynamic random access memory (DRAM) or static random access memory (SRAM). One particular type of DRAM that may be used in a memory module is synchronous dynamic random access memory (SDRAM). In particular embodiments, DRAM of a memory component may comply with a standard promulgated by JEDEC, such as JESD79F for DDR SDRAM, JESD79-2F for DDR2 SDRAM, JESD79-3F for DDR3 SDRAM, JESD79-4A for DDR4 SDRAM, JESD209 for Low Power DDR (LPDDR), JESD209-2 for LPDDR2, JESD209-3 for LPDDR3, and JESD209-4 for LPDDR4 (these standards are available at wwwjedec.org). Such standards (and similar standards) may be referred to as DDR-based standards and communication interfaces of the storage devices that implement such standards may be referred to as DDR-based interfaces.

In some embodiments, the memory device 508 may be embodied as a block addressable memory, such as those based on NAND or NOR technologies. The memory device 508 may also include future generation nonvolatile devices, such as a three dimensional crosspoint memory device (e.g., Intel 3D XPoint™ memory), or other byte addressable write-in-place nonvolatile memory devices. In some embodiments, the memory device 508 may be embodied as, or may otherwise include, chalcogenide glass, multi-threshold level NAND flash memory, NOR flash memory, single or multi-level Phase Change Memory (PCM), a resistive memory, nanowire memory, ferroelectric transistor random access memory (FeTRAM), anti-ferroelectric memory, magnetoresistive random access memory (MRAM) memory that incorporates memristor technology, resistive memory including the metal oxide base, the oxygen vacancy base and the conductive bridge Random Access Memory (CB-RAM), or spin transfer torque (STT)-MRAM, a spintronic magnetic junction memory based device, a magnetic tunneling junction (MTJ) based device, a DW (Domain Wall) and SOT (Spin Orbit Transfer) based device, a thyristor based memory device, or a combination of any of the above, or other memory. The memory device may refer to the die itself and/or to a packaged memory product. In some embodiments, 3D crosspoint memory (e.g., Intel 3D XPoint™ memory) may comprise a transistor-less stackable cross point architecture in which memory cells sit at the intersection of word lines and bit lines and are individually addressable and in which bit storage is based on a change in bulk resistance.

The dashboard 512 of the illustrative control system 502 includes a display 514 and a user interface 516. The display 514 is configured to output or display various indications, messages, and/or prompts to an operator, which may be generated by the control system 502. The user interface 516 is configured to provide various inputs to the control system 502 based on various actions, which may include actions performed by an operator. In some embodiments, it should be appreciated that the mode selector 504 may be coupled to, integrated with, or otherwise form a portion of, the user interface 516.

The one or more front section steering system device(s) 518 of the illustrative control system 502 are embodied as, or otherwise include, any device or collection of devices capable of being enabled to permit, and capable of being disabled to prevent, steering of the front wheels 122 via the front section steering system 140. In some embodiments, the one or more device(s) 518 may be embodied as, or otherwise include, components configured to receive electrical input from the controller 506 that directs enablement or disablement of the device(s) 518. In one example, the device(s) 518 may be embodied as, or otherwise include, one or more electrical actuators and/or solenoid valves. Of course, in other embodiments, it should be appreciated that the device(s) 518 may be embodied as, or otherwise include, one or more other device(s).

The one or more rear articulation section steering system device(s) 520 of the illustrative control system 502 are embodied as, or otherwise include, any device or collection of devices capable of being enabled to permit, and capable of being disabled to prevent, steering of the front wheels 132 via the rear articulation section steering system 150. In some embodiments, the one or more device(s) 520 may be embodied as, or otherwise include, components configured to receive electrical input from the controller 506 that directs enablement or disablement of the device(s) 520. In one example, the device(s) 520 may be embodied as, or otherwise include, one or more electrical actuators and/or solenoid valves. Of course, in other embodiments, it should be appreciated that the device(s) 520 may be embodied as, or otherwise include, one or more other device(s).

The one or more front section sensing device(s) 522, which may be optionally included in the control system 502, are embodied as, or otherwise include, any device or collection of devices capable of sensing one or more operational characteristics (e.g., one or more characteristics of movement, position, speed, acceleration, etc.) associated with the front section 120 in use of the tractor 102. Each of the device(s) 522 may be configured to provide sensor input to the controller 506 indicative of the sensed characteristic(s), and the controller 506 may be configured to perform various activities based on and/or in response to the sensor input. In some embodiments, sensor input provided by the device(s) 522 may be indicative of a current operational mode of the tractor 102, such as one of the reverse modes 210, 310, 410, a neutral mode, or a forward mode, for example.

The one or more rear articulation section sensing device(s) 524, which may be optionally included in the control system 502, are embodied as, or otherwise include, any device or collection of devices capable of sensing one of more operational characteristics (e.g., one or more characteristics of movement, position, speed, acceleration, etc.) associated with the rear articulation section 130 in use of the tractor 102. Each of the device(s) 524 may be configured to provide sensor input to the controller 506 indicative of the sensed characteristic(s), and the controller 506 may be configured to perform various activities based on and/or in response to the sensor input. In some embodiments, sensor input provided by the device(s) 524 may be indicative of a current operational mode of the tractor 102, such as one of the reverse modes 210, 310, 410, a neutral mode, or a forward mode, for example.

Figure 6:
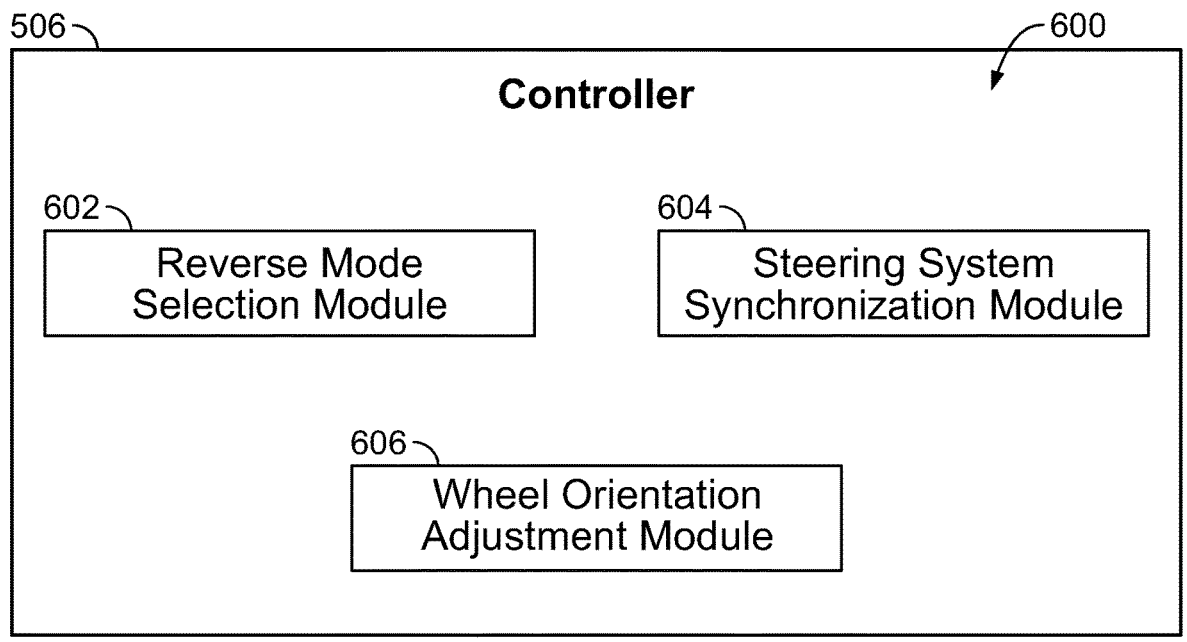
FIG. 6 is a diagrammatic view of a number of modules that may be included in a controller of the control system shown in FIG. 5.

Referring now to FIG. 6, in the illustrative embodiment, the controller 506 establishes an environment 600 during operation. The illustrative environment 600 includes a reverse mode selection module 602, a steering system synchronization module 604, and a wheel orientation adjustment module 606. Each of the modules, logic, and other components of the environment 600 may be embodied as hardware, firmware, software, or a combination thereof. As such, in some embodiments, one or more modules of the environment 600 may be embodied as circuitry or a collection of electrical devices. In such embodiments, one or more of the reverse mode selection module 602, the steering system synchronization module 604, and the wheel orientation adjustment module 606 may form a portion of the processor(s) 510 and/or other components of the controller 506. Additionally, in some embodiments, one or more of the illustrative modules may form a portion of another module and/or one or more of the illustrative modules may be independent of one another. Further, in some embodiments, one or more of the modules of the environment 600 may be embodied as virtualized hardware components or emulated architecture, which may be established and maintained by the processor(s) 510 or other components of the controller 506.

The reverse mode selection module 602, which may be embodied as hardware, firmware, software, virtualized hardware, emulated architecture, and/or a combination thereof as discussed above, is configured to direct selection of one of the reverse modes 210, 310, 410 based on operator input provided to the controller 506 by the mode selector 504 in use of the tractor 102. To do so, in the illustrative embodiment, the reverse mode selection module 602 may perform the method described below with reference to FIG. 7.

The steering system synchronization module 604, which may be embodied as hardware, firmware, software, virtualized hardware, emulated architecture, and/or a combination thereof as discussed above, is configured to direct selective synchronization of the operation of the front section and rear articulation section steering systems 140, 150 based on operator input provided to the controller 506 by the mode selector 504 in use of the tractor 102. To do so, in the illustrative embodiment, the steering system synchronization module 604 may perform the method described below with reference to FIG. 8.

The wheel orientation adjustment module 606, which may be embodied as hardware, firmware, software, virtualized hardware, emulated architecture, and/or a combination thereof as discussed above, is configured to direct adjustment of the angular orientation of the front wheels 122 and/or the rear wheels 132 based on operator input provided to the controller 506 by the front section steering system 140 and/or the rear articulation section steering system 150 in use of the tractor 102. To do so, in the illustrative embodiment, the wheel orientation adjustment module 606 may perform the method described below with reference to FIG. 9.

Figure 7:
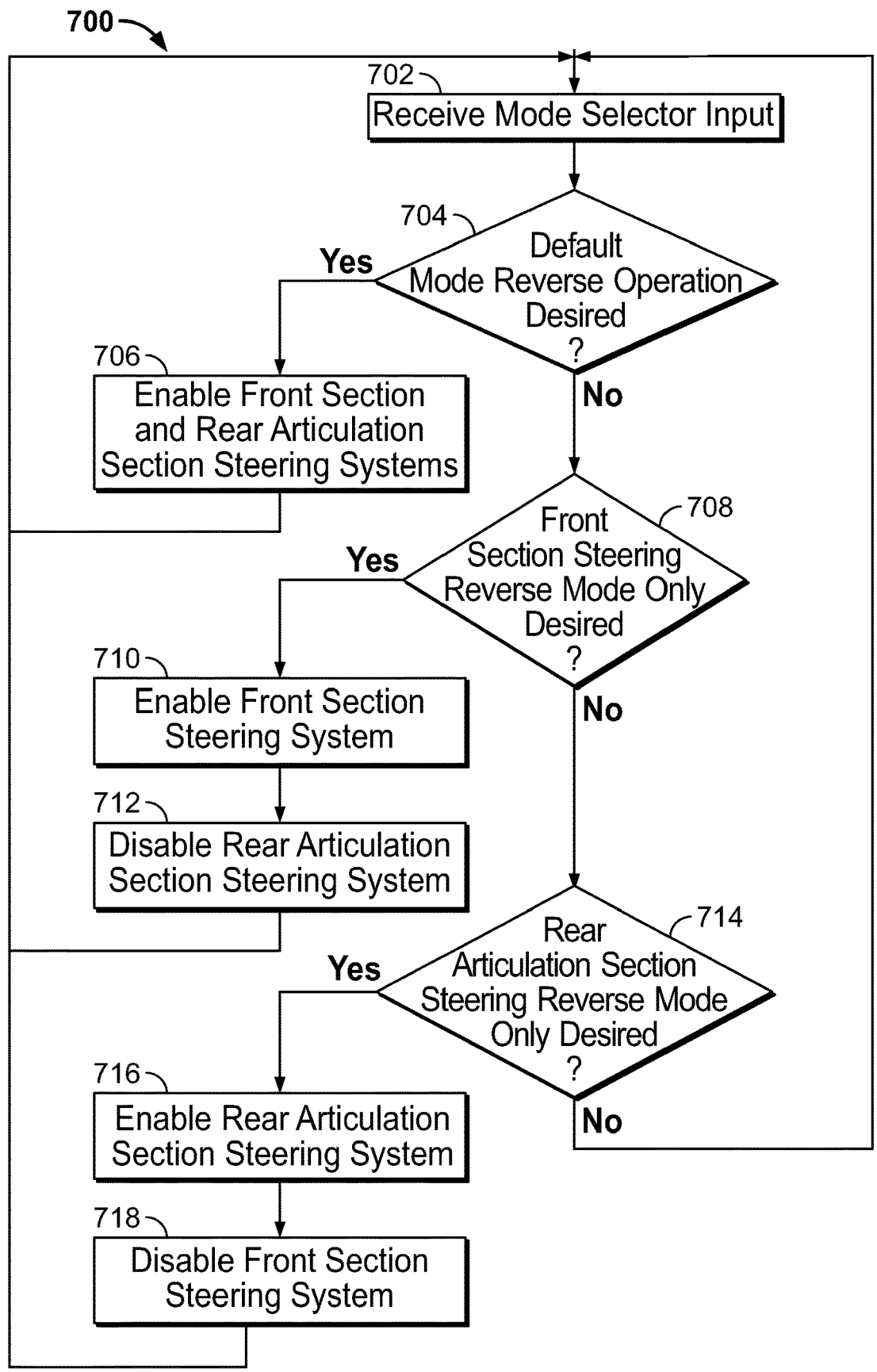
FIG. 7 is a simplified flowchart of a method that may be performed by a mode selection module of the controller diagrammatically depicted in FIG. 6.

Referring now to FIG. 7, an illustrative method 700 of operating the vehicle 100 may be embodied as, or otherwise include, a set of instructions that are executable by the control system 502 (i.e., the reverse mode selection module 602 of the controller 506). The method 700 corresponds to, or is otherwise associated with, performance of the blocks described below in the illustrative sequence of FIG. 7. It should be appreciated, however, that the method 700 may be performed in one or more sequences different from the illustrative sequence.

The illustrative method 700 begins with block 702. In block 702, the controller 506 receives operator input provided by the mode selector 504. In the illustrative embodiment, the operator input received by the controller 506 in block 702 is indicative of one of the reverse modes 210, 310, 410 selected by the operator in use of the vehicle 100. From block 702, the method 700 subsequently proceeds to block 704.

In block 704 of the illustrative method 700, the controller 506 determines whether operation of the vehicle 100 in the default reverse mode 410 is desired based on the input received in block 702. If the controller 506 determines in block 704 that operation of the vehicle 100 in the default reverse mode 410 is desired, the method 700 subsequently proceeds to block 706.

In block 706 of the illustrative method 700, the controller 506 enables the one or more device(s) 518, 520 to enable the front section and rear articulation section steering systems 140, 150. As a result, in block 706, the controller 506 enables an operator to steer the wheels 122, 132 independently of another in the default reverse mode 410. Following completion of block 706, the method 700 subsequently returns to block 702.

Returning to block 704 of the illustrative method 700, if the controller 506 determines in block 704 that operation of the vehicle 100 in the default reverse mode 410 is not desired, the method 700 subsequently proceeds to block 708. In block 708, the controller 506 determines, based on the input received in block 702, whether operation of the vehicle 100 in the front section steering reverse mode 210 is desired. If the controller 506 determines in block 708 that operation of the vehicle 100 in the front section steering reverse mode 210 is desired, the method 700 subsequently proceeds to block 710.

In block 710 of the illustrative method 700, the controller 506 enables the one or more devices 518 to enable the front section steering system 140. As a result, in block 710, the controller 506 enables an operator to steer the wheels 122 in the front section steering reverse mode 210. Following completion of block 710, the method 700 subsequently proceeds to block 712.

In block 712 of the illustrative method 700, the controller 506 disables the one or more devices 520 to disable the rear articulation section steering system 150. As a result, in block 712, the controller 506 prevents an operator from steering the wheels 132 in the front section steering reverse mode 210. Following completion of block 712, the method 700 subsequently returns to block 702.

Returning to block 708 of the illustrative method 700, if the controller 506 determines in block 708 that operation of the vehicle 100 in the front section steering reverse mode 210 is not desired, the method 700 subsequently proceeds to block 714. In block 714, the controller 506 determines, based on the input received in block 702, whether operation of the vehicle 100 in the rear articulation section steering reverse mode 310 is desired. If the controller 506 determines in block 714 that operation of the vehicle 100 in the rear articulation section steering reverse mode 310 is desired, the method 700 subsequently proceeds to block 716.

In block 716 of the illustrative method 700, the controller 506 enables the one or more devices 520 to enable the rear articulation section steering system 150. As a result, in block 716, the controller 506 enables an operator to steer the wheels 132 in the rear articulation section steering reverse mode 310. Following completion of block 716, the method 700 subsequently proceeds to block 718.

In block 718 of the illustrative method 700, the controller 506 disables the one or more devices 518 to disable the front section steering system 140. As a result, in block 718, the controller 506 prevents an operator from steering the wheels 122 in the rear articulation section steering reverse mode 310. Following completion of block 718, the method 700 subsequently returns to block 702.

Figure 8:
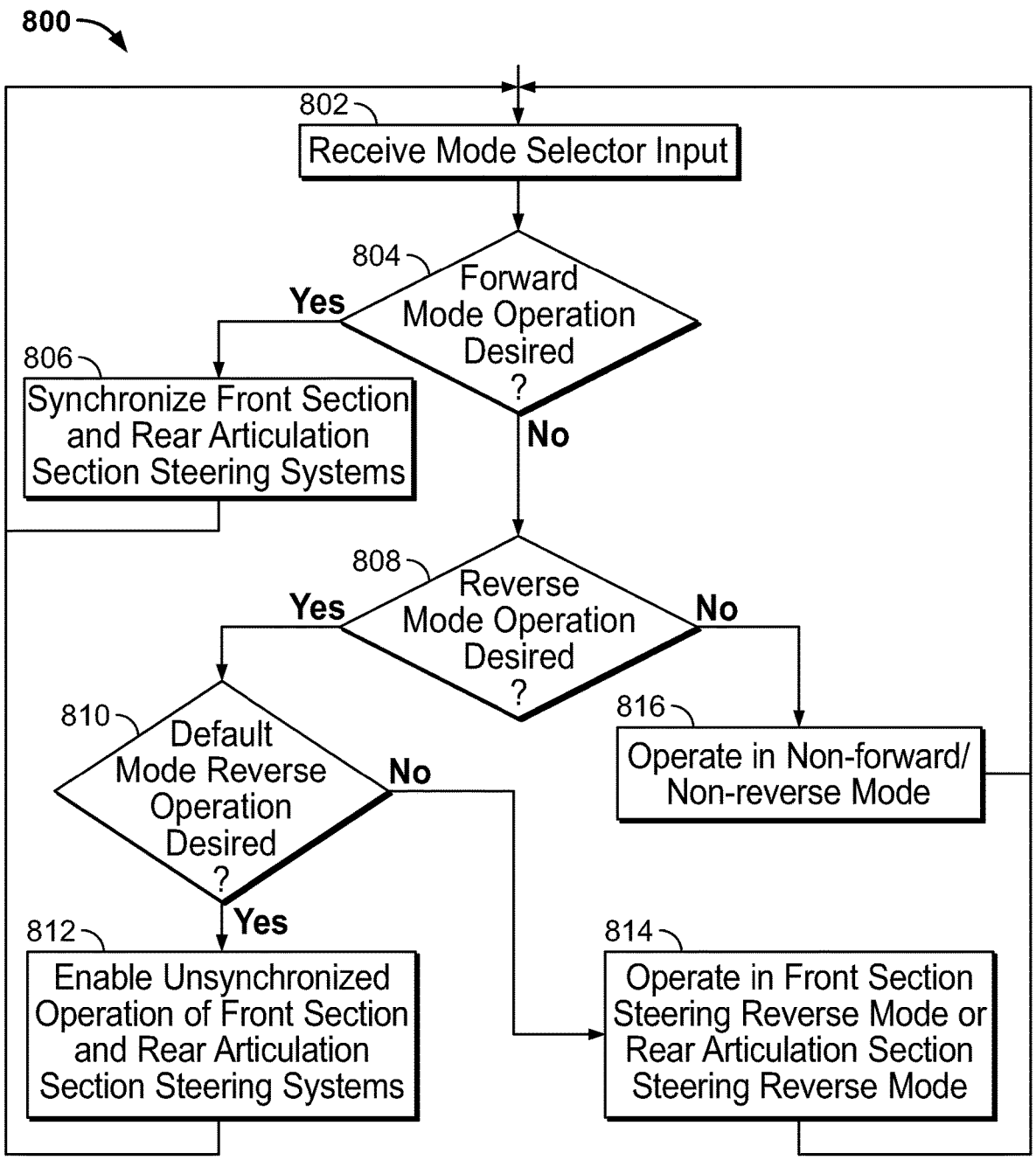
FIG. 8 is a simplified flowchart of a method that may be performed by a steering system synchronization module of the controller diagrammatically depicted in FIG. 6.

Referring now to FIG. 8, an illustrative method 800 of operating the vehicle 100 may be embodied as, or otherwise include, a set of instructions that are executable by the control system 502 (i.e., the steering system synchronization module 604 of the controller 506). The method 800 corresponds to, or is otherwise associated with, performance of the blocks described below in the illustrative sequence of FIG. 8. It should be appreciated, however, that the method 800 may be performed in one or more sequences different from the illustrative sequence.

The illustrative method begins with block 802. In block 802, the controller 506 receives operator input provided by the mode selector 504. In the illustrative embodiment, the operator input received by the controller 506 in block 802 is indicative of any operating mode selected by the operator in use of the vehicle 100, such as any one of the reverse modes 210, 310, 410, any one of one or more neutral modes, and any one of one or more forward modes, for example. From block 802, the method 800 subsequently proceeds to block 804.

In block 804 of the illustrative method 800, the controller 506 determines, based on the input received in block 802, whether operation of the vehicle 100 in a forward mode is desired. If the controller 506 determines in block 804 that operation of the vehicle 100 in a forward mode is desired, the method 800 subsequently proceeds to block 806.

In block 806 of the illustrative method 800, the controller 506 synchronizes operation of the front section and the rear articulation section steering systems 140, 150. To do so, in some embodiments, the controller 506 may direct adjustment of the angular orientations of the front wheels 122 and/or the rear wheels 132 such that the wheels 122, 132 have substantially the same angular orientations relative to the vehicle axis VA. That is, the controller 506 may steer the front wheels 122 and/or the rear wheels 132 such that the wheels 122, 132 have substantially the same angular orientations relative to the vehicle axis VA. It should be appreciated that execution of the block 806 by the controller 506 presumes that operation of the steering systems 140, 150 has not already been synchronized. Of course, in the event that operation of the steering systems 140, 150 has been synchronized prior to execution of block 806, performance of that block 806 may be omitted. In any case, following completion of block 806, the method 800 subsequently returns to block 802.

Returning to block 804 of the illustrative method 800, if the controller 506 determines in block 804 that operation of the vehicle 100 in a forward mode is not desired, the method 800 subsequently proceeds to block 808. In block 808, the controller 506 determines, based on the input received in block 802, whether operation of the vehicle 100 in any one of the reverse modes 210, 310, 410 is desired. If the controller 506 determines in block 808 that operation of the vehicle 100 in any one of the reverse modes 210, 310, 410 is desired, the method 800 subsequently proceeds to block 810.

In block 810 of the illustrative method 800, the controller 506 determines, based on the input received in block 802, whether operation of the vehicle 100 in the default reverse mode 410 is desired. If the controller 506 determines in block 810 that operation of the vehicle 100 in the default reverse mode 410 is desired, the method 800 subsequently proceeds to block 812.

In block 812 of the illustrative method 800, the controller 506 enables unsynchronized operation of the front section and the rear articulation section steering systems 140, 150 in the default reverse mode 410. That is, in block 812, the controller 506 enables independent steering of the front wheels 122 and the rear wheels 132 in the default reverse mode 410 via the corresponding front section and rear articulation section steering systems 140, 150 without synchronizing the angular orientations of the wheels 122, 132 relative to the vehicle axis VA. Following completion of the block 812, the method 800 subsequently returns to block 802.

Returning to block 810 of the illustrative method 800, if the controller 506 determines in block 810 that operation of the vehicle 100 in the default reverse mode 410 is not desired, the method 800 subsequently proceeds to block 814. In block 814, the controller 506, based on the input received in block 802, directs operation of the vehicle 100 in either the front section steering reverse mode 210 or the rear articulation steering reverse mode 310. Following completion of block 814, the method 800 subsequently returns to block 802.

Returning to block 808 of the illustrative method 800, if the controller 506 determines in block 808 that operation of the vehicle 100 in any one of the reverse modes 210, 310, 410 is not desired, the method 800 subsequently proceeds to block 816. In block 816, the controller 506, based on the input received in block 802, directs operation of the vehicle 100 in a non-forward/non-reverse operating mode (e.g., a neutral mode). Following completion of block 816, the method 800 subsequently returns to block 802.

Figure 9:
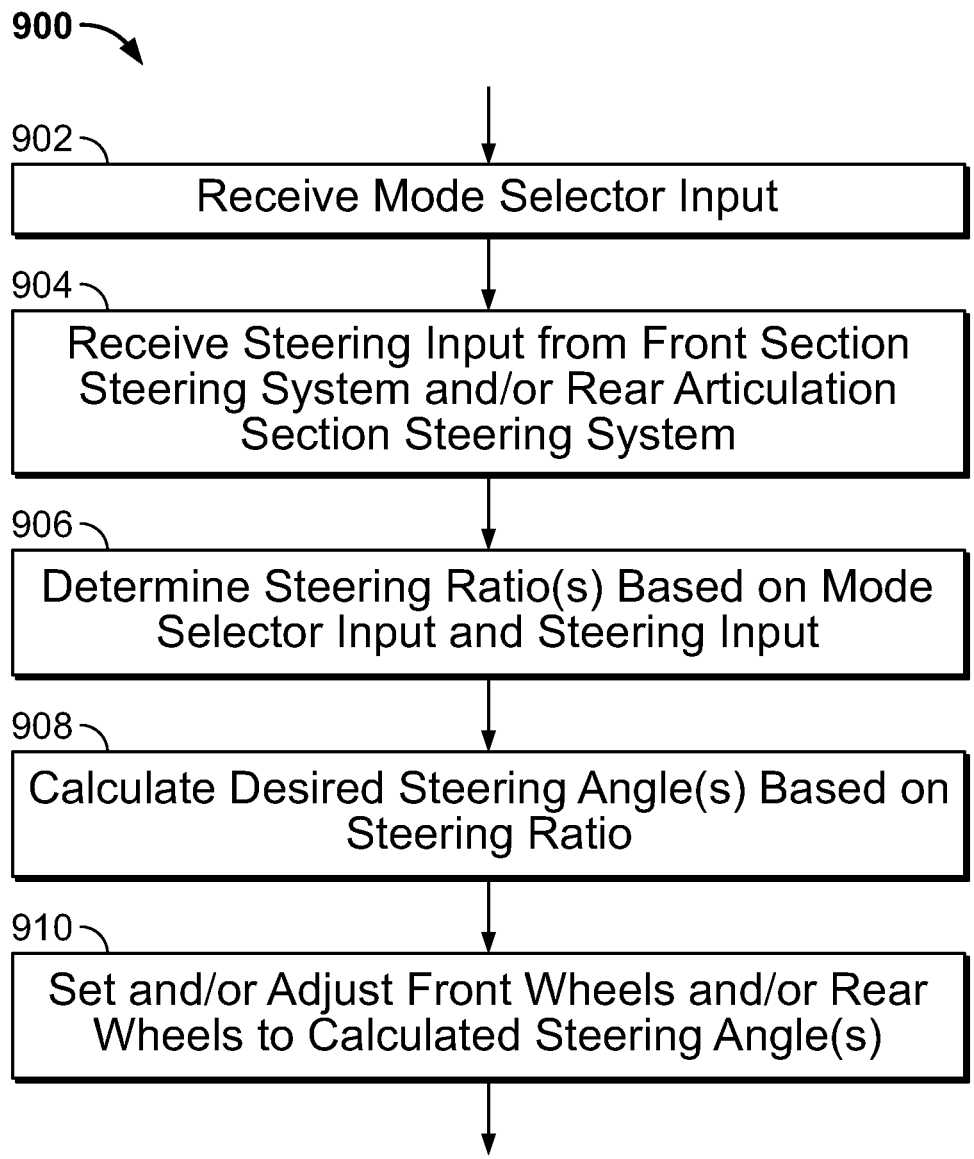
FIG. 9 is a simplified flowchart of a method that may be performed by a wheel orientation adjustment module of the controller diagrammatically depicted in FIG. 6.

Referring now to FIG. 9, an illustrative method 900 of operating the vehicle 100 may be embodied as, or otherwise include, a set of instructions that are executable by the control system 502 (i.e., the wheel orientation adjustment module 606 of the controller 506). The method 900 corresponds to, or is otherwise associated with, performance of the blocks described below in the illustrative sequence of FIG. 9. It should be appreciated, however, that the method 900 may be performed in one or more sequences different from the illustrative sequence.

The illustrative method begins with block 902. In block 902, the controller 506 receives operator input provided by the mode selector 504. In the illustrative embodiment, the operator input received by the controller 506 in block 902 is indicative of any operating mode selected by the operator in use of the vehicle 100, such as any one of the reverse modes 210, 310, 410, any one of one or more neutral modes, and any one of one or more forward modes, for example. From block 902, the method 900 subsequently proceeds to block 904.

In block 904 of the illustrative method 900, the controller 506 receives steering input provided by an operator using the front section steering system 140 (e.g., a steering wheel thereof) and/or the rear articulation section steering system 150 (e.g., a steering wheel thereof). Of course, it should be appreciated that if an operator selects the front section steering reverse mode 210, the steering input received in block 904 may be provided only by the steering system 140. Moreover, it should be appreciated that if an operator selects the rear articulation section steering reverse mode 310, the steering input received in block 904 may be provided only by the steering system 150. Furthermore, it should be appreciated that if an operator selects the default reverse mode 410, the steering input received in block 904 may be provided by both of the steering systems 140, 150. In any case, the steering input provided using the front section and/or rear articulation section steering systems 140, 150 in block 904 may account for, or otherwise include, information associated with operator manipulation of the steering system 140 and/or the steering system 150, such as rates at which steering wheels of the corresponding systems 140, 150 are turned by an operator, for example. From block 904, the method 900 subsequently proceeds to block 906.

In block 906 of the illustrative method 900, the controller 506 determines one or more steering ratios based on the mode selector input received in block 902 and the steering input received in block 904. To do so, in some embodiments, the controller 506 may reference a lookup table containing various steering ratios that is stored in the memory device 508. In any case, from block 906, the method 900 subsequently proceeds to block 908.

In block 908 of the illustrative method 900, the controller 506 calculates one or more desired steering angle orientations of the front wheels 122 and/or the rear wheels 132 based on the one or more steering ratios determined in block 906. From block 908, the method 900 subsequently proceeds to block 910.

In block 910 of the illustrative method 900, the controller 506 sets and/or adjusts the angular orientations of the front wheels 122 and/or the rear wheels 132 to the one or more orientations calculated in block 908. Completion of block 910 corresponds to, or is associated with, completion of one iteration of the illustrative method 900.

Figure 10:
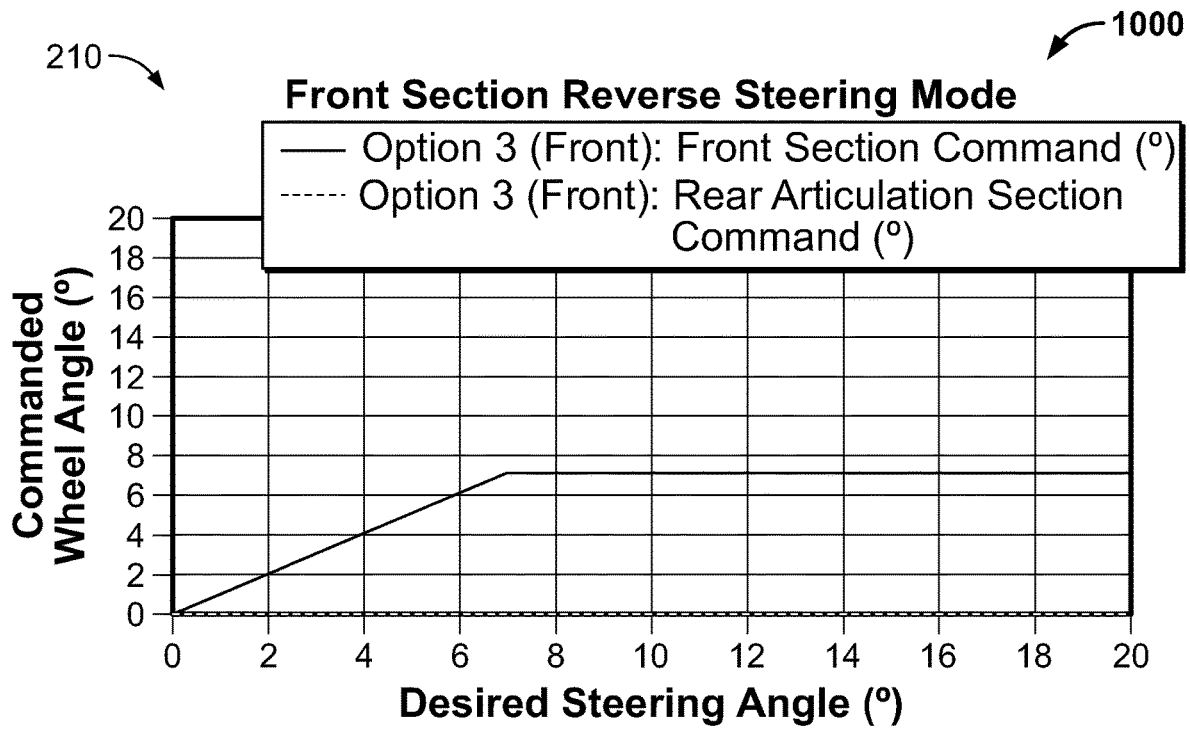
FIG. 10 is a graphical representation corresponding to the reverse operating mode depicted in FIG. 2.
Figure 11:
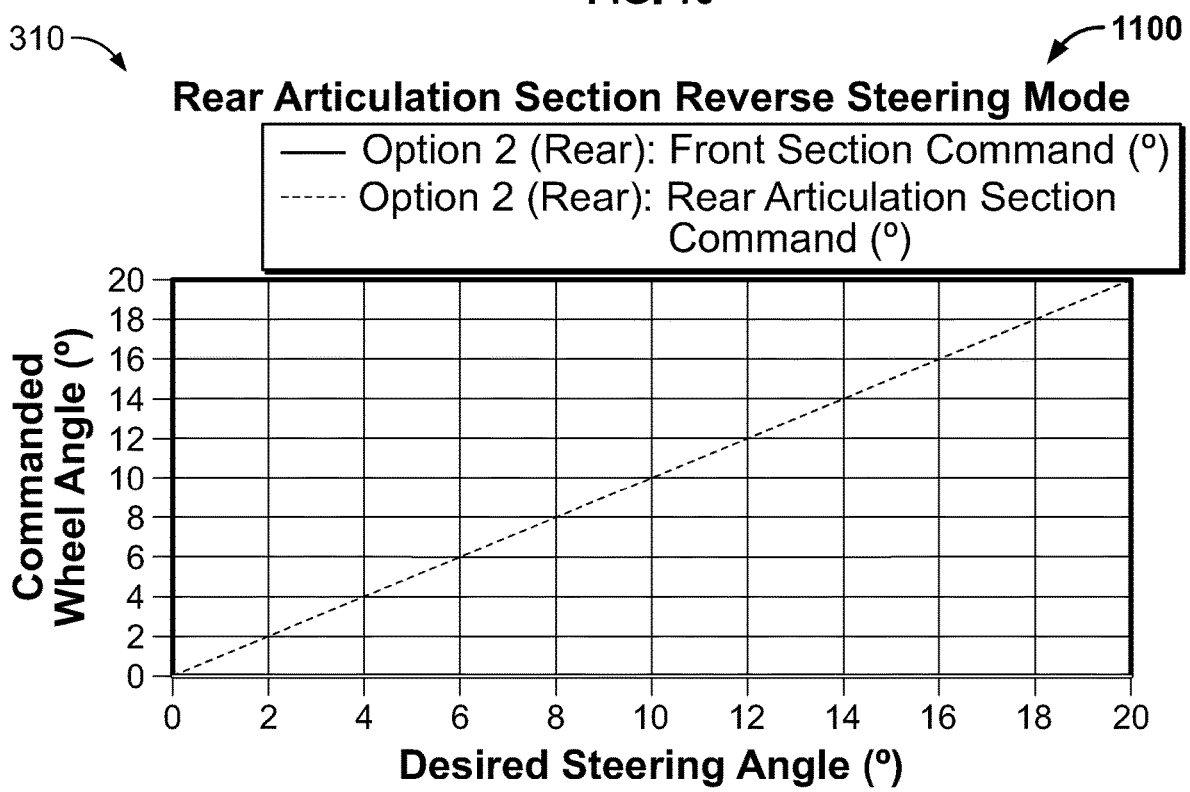
FIG. 11 is a graphical representation corresponding to the reverse operating mode depicted in FIG. 3.
Figure 12:
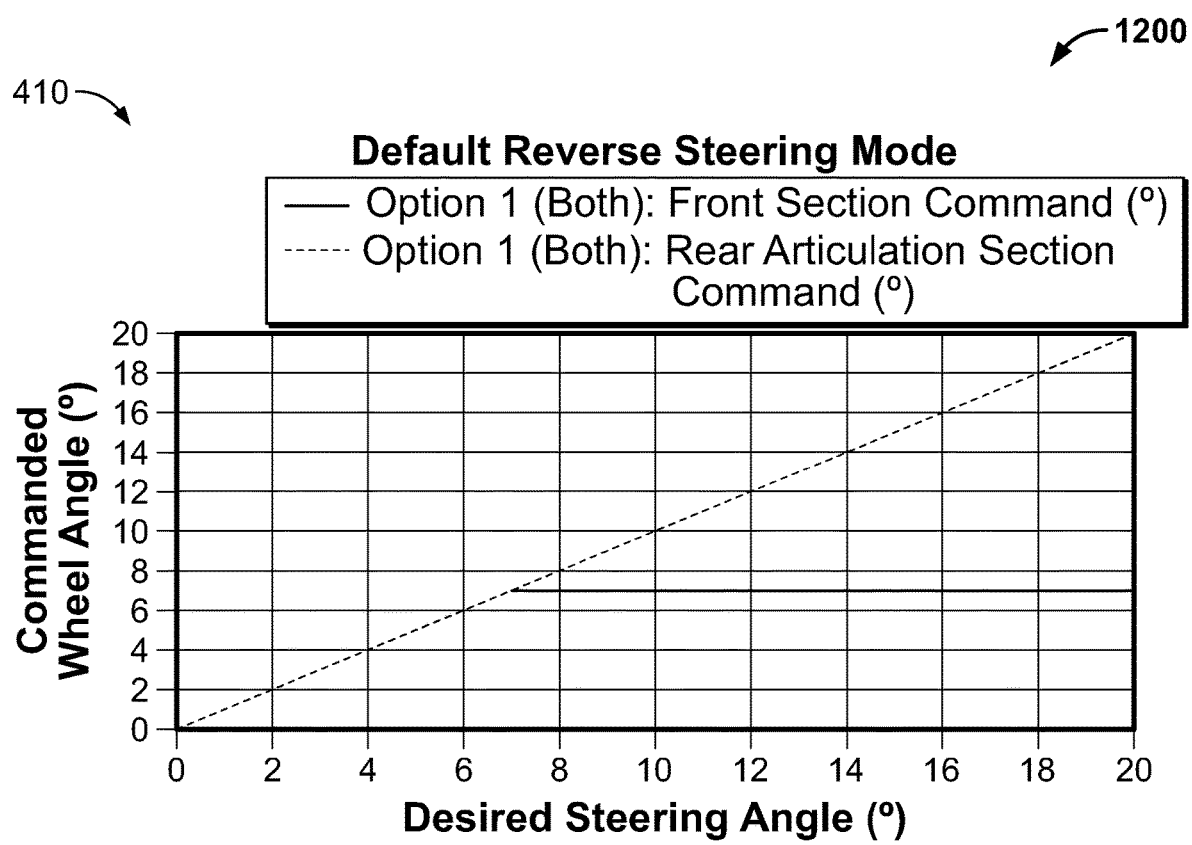
FIG. 12 is a graphical representation corresponding to the reverse operating mode depicted in FIG. 4.

Referring now to FIGS. 10-12, respective graphical representations 1000, 1100, 1200 of commanded wheel angles (i.e., with respect to the vehicle axis VA) are plotted relative to desired steering angles (i.e., with respect to the vehicle axis VA) in each of the reverse modes 210, 310, 410. The graphical representation 1000 depicted in FIG. 10 corresponds to operation of the vehicle 100 in the front section reverse steering mode 210. The graphical representation 1100 depicted in FIG. 11 corresponds to operation of the vehicle 100 in the rear articulation section reverse steering mode 310. The graphical representation 1200 depicted in FIG. 12 corresponds to operation of the vehicle 100 in the default reverse mode 410.

While the disclosure has been illustrated and described in detail in the foregoing drawings and description, the same is to be considered as exemplary and not restrictive in character, it being understood that only illustrative embodiments thereof have been shown and described and that all changes and modifications that come within the spirit of the disclosure are desired to be protected.

The invention claimed is:

1. A vehicle comprising:
   a frame structure;
   a front section coupled to the frame structure and to a front plurality of wheels supported for movement on a front axle;
   a rear articulation section coupled to the frame structure and to a rear plurality of wheels supported for movement on a rear axle, wherein the rear articulation section is pivotally coupled to the front section via an articulation joint and arranged opposite the front section along a vehicle axis; and
   a control system coupled to the frame structure that includes a mode selector configured to provide input indicative of a mode selected by an operator in use of the vehicle and a controller communicatively coupled to the mode selector, wherein the controller includes memory having instructions stored therein that are executable by a processor to cause the processor to receive the input provided by the mode selector and to selectively enable an operator to steer the front plurality of wheels and the rear plurality of wheels independently of one another based on the input to facilitate positioning of an implement attachment interface of the vehicle relative to a work implement in use of the vehicle, and
   wherein when independent steering of the front plurality of wheels and the rear plurality of wheels is enabled, (i) steering of the front plurality of wheels is limited relative to the rear plurality of wheels to achieve a fine steering adjustment of the front plurality of wheels and a coarse steering adjustment of the rear plurality of wheels which is less limited than the fine steering adjustment of the front plurality of wheels, (ii) steering of the front plurality of wheels above a reference desired steering angle with respect to the vehicle axis, which corresponds to a reference commanded wheel angle with respect to the vehicle axis, is independent of an increase in commanded wheel angle above the reference commanded wheel angle, and (iii) steering of the rear plurality of wheels above the reference desired steering angle is associated with an increase in commanded wheel angle above the reference commanded wheel angle.

2. The vehicle of claim 1, wherein the mode selector is configured to provide input indicative of a reverse mode selected by an operator in use of the vehicle, and wherein the instructions stored in the memory are executable by the processor to cause the processor to receive the input provided by the mode selector and to selectively enable an operator to steer the front plurality of wheels and the rear plurality of wheels independently of one another based on the input in the reverse mode.

3. The vehicle of claim 1, wherein the mode selector is configured to provide input indicative of one of a plurality of reverse modes selected by an operator in use of the vehicle, and wherein the instructions stored in the memory are executable by the processor to cause the processor to receive the input provided by the mode selector and to selectively enable an operator to steer the front plurality of wheels and the rear plurality of wheels independently of another based on the input in a default reverse mode of the plurality of reverse modes.

4. The vehicle of claim 1, wherein the instructions stored in the memory are executable by the processor to cause the processor to determine, based on the input, whether operation of the vehicle in a default reverse mode is desired and to selectively enable a front section steering system associated with the front plurality of wheels and a rear articulation section steering system associated with the rear plurality of wheels in response to that determination to permit steering of the front plurality of wheels and the rear plurality of wheels independently of one another.

5. The vehicle of claim 4, wherein:
   the instructions stored in the memory are executable by the processor to cause the processor to determine, based on the input, whether operation of the vehicle in a front section steering reverse mode is desired and to selectively enable the front section steering system and disable the rear articulation section steering system in response to that determination to permit steering of the front plurality of wheels only; and
   the instructions stored in the memory are executable by the processor to cause the processor to determine, based on the input, whether operation of the vehicle in a rear articulation section steering reverse mode is desired and to selectively disable the front section steering system and enable the rear articulation section steering system in response to that determination to permit steering of the rear plurality of wheels only.

6. The vehicle of claim 1, wherein the mode selector is configured to provide input indicative of one of a plurality of reverse modes selected by an operator in use of the vehicle, and wherein the plurality of reverse modes include a default reverse mode in which steering of the front plurality of wheels and the rear plurality of wheels may be performed independently of another, a front section steering reverse mode in which only steering of the front plurality of wheels may be performed, and a rear articulation section steering reverse mode in which only steering of the rear plurality of wheels may be performed.

7. The vehicle of claim 1, wherein the instructions stored in the memory are executable by the processor to cause the processor to determine, based on the input, whether operation of the vehicle in a forward mode is desired and to synchronize operation of a front section steering system associated with the front plurality of wheels and a rear articulation section steering system associated with the rear plurality of wheels in response to a determination that operation of the vehicle in a forward mode is desired.

8. The vehicle of claim 7, wherein the instructions stored in the memory are executable by the processor to cause the processor to determine whether operation of the vehicle in a default reverse mode is desired in response to a determination that operation of the vehicle in a forward mode is not desired and to enable unsynchronized operation of the front section steering system and the rear articulation section steering system in response to a determination that operation of the vehicle in the default reverse mode is desired.

9. The vehicle of claim 7, wherein the instructions stored in the memory are executable by the processor to cause the processor to determine whether operation of the vehicle in a default reverse mode is desired in response to a determination that operation of the vehicle in a forward mode is not desired and to enable operation of the vehicle in either a front section steering reverse mode in which only steering of the front plurality of wheels may be performed or a rear articulation section steering reverse mode in which only steering of the rear plurality of wheels may be performed in response to a determination that operation of the vehicle in the default reverse mode is not desired.

10. The vehicle of claim 1, wherein the reference desired steering angle is 7 degrees with respect to the vehicle axis, and wherein the reference commanded wheel angle is 7 degrees with respect to the vehicle axis.

11. A control system mounted on a vehicle including a frame structure, a front section coupled to the frame structure and to a plurality of front wheels supported for movement on a front axle, and a rear articulation section coupled to the frame structure and to a rear plurality of wheels supported for movement on a rear axle and pivotally coupled to the front section via an articulation joint, the control system comprising:
  a mode selector configured to provide input indicative of a mode selected by an operator in use of the vehicle; and
  a controller communicatively coupled to the mode selector, wherein the controller includes memory having instructions stored therein that are executable by a processor to cause the processor to receive the input provided by the mode selector and to selectively enable an operator to steer the front plurality of wheels and the rear plurality of wheels independently of one another based on the input, and
  wherein when independent steering of the front plurality of wheels and the rear plurality of wheels is enabled, (i) steering of the front plurality of wheels is limited relative to the rear plurality of wheels to achieve a fine steering adjustment of the front plurality of wheels associated with a first commanded wheel angle range and a coarse steering adjustment of the rear plurality of wheels associated with a second commanded wheel angle range which is greater than the first commanded wheel angle range, (ii) steering of the front plurality of wheels above a reference desired steering angle with respect to the vehicle axis, which corresponds to a reference commanded wheel angle with respect to the vehicle axis, is independent of an increase in commanded wheel angle above the reference commanded wheel angle, and (iii) steering of the rear plurality of wheels above the reference desired steering angle is associated with an increase in commanded wheel angle above the reference commanded wheel angle.

12. The control system of claim 11, wherein the instructions stored in the memory are executable by the processor to cause the processor to determine, based on the input, whether operation of the vehicle in a default reverse mode is desired and to selectively enable a front section steering system associated with the front section and a rear articulation section steering system associated with the rear articulation section in response to that determination to permit steering of the front plurality of wheels and the rear plurality of wheels independently of one another.

13. The control system of claim 12, wherein:
  the instructions stored in the memory are executable by the processor to cause the processor to determine, based on the input, whether operation of the vehicle in a front section steering reverse mode is desired and to selectively enable the front section steering system and disable the rear articulation section steering system in response to that determination to permit steering of the front plurality of wheels only; and
  the instructions stored in the memory are executable by the processor to cause the processor to determine, based on the input, whether operation of the vehicle in a rear articulation section steering reverse mode is desired and to selectively disable the front section steering system and enable the rear articulation section steering system in response to that determination to permit steering of the rear plurality of wheels only.

14. The control system of claim 11, wherein the instructions stored in the memory are executable by the processor to cause the processor to determine, based on the input, whether operation of the vehicle in a forward mode is desired and to synchronize operation of a front section steering system associated with the front section and a rear articulation section steering system associated with the rear articulation section in response to a determination that operation of the vehicle in a forward mode is desired.

15. The control system of claim 14, wherein the instructions stored in the memory are executable by the processor to cause the processor to determine whether operation of the vehicle in a default reverse mode is desired in response to a determination that operation of the vehicle in a forward mode is not desired and to enable unsynchronized operation of the front section steering system and the rear articulation section steering system in response to a determination that operation of the vehicle in the default reverse mode is desired.

16. A method of operating a vehicle including a frame structure, a front section coupled to the frame structure and to a plurality of front wheels supported for movement on a front axle, and a rear articulation section coupled to the frame structure and to a rear plurality of wheels supported for movement on a rear axle and pivotally coupled to the front section via an articulation joint, the method comprising:
  receiving, by a controller of the vehicle, input indicative of a mode selected by an operator in use of the vehicle; and
  selectively enabling, by the controller, an operator to steer the front plurality of wheels and the rear plurality of wheels independently of one another based on the input,
  wherein when independent steering of the front plurality of wheels and the rear plurality of wheels is enabled, (i) steering of the front plurality of wheels is limited relative to the rear plurality of wheels to achieve a fine steering adjustment of the front plurality of wheels associated with a first commanded wheel angle range and a coarse steering adjustment of the rear plurality of wheels associated with a second commanded wheel angle range which is greater than the first commanded wheel angle range, (ii) steering of the front plurality of wheels above a reference desired steering angle with respect to the vehicle axis, which corresponds to a reference commanded wheel angle with respect to the vehicle axis, is independent of an increase in commanded wheel angle above the reference commanded wheel angle, and (iii) steering of the rear plurality of wheels above the reference desired steering angle is associated with an increase in commanded wheel angle above the reference commanded wheel angle.

17. The method of claim 16, further comprising:
  determining, by the controller and based on the input, whether operation of the vehicle in a default reverse mode is desired; and
  enabling, by the controller, a front section steering system associated with the front section and a rear articulation section steering system associated with the rear articulation section to permit steering of the front plurality of wheels and the rear plurality of wheels independently of one another in response to determining that operation of the vehicle in the default reverse mode is desired.

18. The method of claim 16, further comprising:

determining, by the controller and based on the input, whether operation of the vehicle in a front section steering reverse mode is desired; and enabling, by the controller, the front section steering system and disabling, by the controller, the rear articulation section steering system to permit steering of the front plurality of wheels only in response to determining that operation of the vehicle in the front section steering reverse mode is desired.

19. The method of claim 16, further comprising:

determining, by the controller and based on the input, whether operation of the vehicle in a rear articulation section steering reverse mode is desired; and enabling, by the controller, the rear articulation section steering system and disabling, by the controller, the front section steering system to permit steering of the rear plurality of wheels only in response to determining that operation of the vehicle in the rear articulation section steering reverse mode is desired.

\* \* \* \* \*